United States Patent
Kim et al.

(10) Patent No.: US 10,316,905 B2
(45) Date of Patent: Jun. 11, 2019

(54) METHOD FOR PREVENTING BURST OF CLUTCH FOR VEHICLE

(71) Applicants: HYUNDAI MOTOR COMPANY, Seoul (KR); KIA MOTORS CORPORATION, Seoul (KR)

(72) Inventors: Jin Sung Kim, Hwaseong-si (KR); Dong Hyup Kang, Seoul (KR)

(73) Assignees: HYUNDAI MOTOR COMPANY, Seoul (KR); KIA MOTORS COMPANY, Seoul (KR)

(*) Notice: Subject to any disclaimer, the term of this patent is extended or adjusted under 35 U.S.C. 154(b) by 0 days.

(21) Appl. No.: 15/826,014

(22) Filed: Nov. 29, 2017

(65) Prior Publication Data
US 2018/0320744 A1    Nov. 8, 2018

(30) Foreign Application Priority Data
May 2, 2017   (KR) .................. 10-2017-0056093

(51) Int. Cl.
*F16D 48/08* (2006.01)

(52) U.S. Cl.
CPC .... *F16D 48/08* (2013.01); *F16D 2500/10412* (2013.01); *F16D 2500/30806* (2013.01); *F16D 2500/31426* (2013.01)

(58) Field of Classification Search
CPC .......... F16D 48/08; F16D 2500/30806; F16D 2500/31426; F16D 2500/50206; F16D 2500/50215; F16D 2500/50224
See application file for complete search history.

(56) References Cited

U.S. PATENT DOCUMENTS

| 2005/0272558 A1* | 12/2005 | Yoshida | F16D 48/06 477/180 |
| 2006/0040789 A1* | 2/2006 | Katou | B60W 10/02 477/97 |
| 2014/0018209 A1* | 1/2014 | Dodo | F16D 48/08 477/176 |

FOREIGN PATENT DOCUMENTS

| JP | 4089571 | 5/2008 |
| JP | 4119837 | 5/2008 |
| KR | 20150024739 | 3/2015 |

* cited by examiner

*Primary Examiner* — Edwin A Young
(74) *Attorney, Agent, or Firm* — Brinks Gilson & Lione

(57) ABSTRACT

The present disclosure relates to a technique of suppressing the occurrence of an impact caused by clutch engagement by differently controlling a clutch depending on whether or not a brake is in operation. Disclosed is a method of controlling a clutch for a vehicle, which effectively reduces engagement impact that occurs when the clutch is engaged by performing control such that a rising slope of clutch torque up to a touch point is gentler when the brake is not in operation than when the brake is in operation.

8 Claims, 3 Drawing Sheets

METHOD FOR PREVENTING BURST OF CLUTCH FOR VEHICLE

CROSS RELATED REFERENCE TO RELATED APPLICATION

The present application claims priority to and the benefit of Korean Patent Application No. 10-2017-0056093, filed May 2, 2017, which is incorporated herein by reference in its entirety.

FIELD

The present disclosure relates to a method for controlling a clutch for a vehicle, by which a clutch is controlled differently depending on whether or not a brake is in operation in order to thereby suppress the occurrence of an impact caused by clutch engagement.

BACKGROUND

The statements in this section merely provide background information related to the present disclosure and may not constitute prior art.

A typical automatic transmission system has an advantage in terms of starting/transmission because a torque converter acts as a fluid clutch, thereby obtaining a damping effect.

On the other hand, an automated manual transmission (AMT) system and a dual clutch transmission (DCT) system have high fuel efficiency because a clutch is automatically controlled based on a manual transmission mechanism without using a torque converter.

However, the automated manual transmission system directly connects an engine and a clutch in order to thereby improve fuel efficiency and power transmission efficiency, but on the other hand, has no damping factor so that a jolt or clutch slip may occur depending on a torque change. Therefore, it requires an algorithm for predicting the transmission torque characteristics of a dry clutch in real time.

Thus, conventionally, the transmission torque characteristics of a clutch have been predicted using a torque-stroke curve (T-S curve) of a dry clutch. Here, the T-S curve is obtained by converting, into data, the transmission torque characteristics of a dry clutch depending on a stroke of a clutch actuator.

Meanwhile, when a released clutch is engaged, the time at which torque begins to be actually transmitted through the clutch is referred to as a touch point.

However, the T-S curve varies while the vehicle is moving for various reasons such as deterioration and expansion of a disk cushion, thermal deformation of a cover plate, abrasion of disk facings, and variation of the frictional coefficient, and thus, an error may occur in the learning touch point.

Therefore, if a learning value of a clutch touch point is greater than the position of an actual touch point, a clutch actuator stroke greater than the actual touch point is applied, so that an impact due to the clutch engagement may occur when clutch torque is applied.

The description of the technical background above has been made merely for the purpose of helping understanding the background of the present disclosure, and it should not be taken as an admission that the description belongs to the prior art known to those skilled in the art.

SUMMARY

The present disclosure has been made in order to solve the problems above, and an objective of the present disclosure is to provide a method for controlling a clutch for a vehicle, by which a clutch is controlled differently depending on whether or not a brake is in operation in order to thereby suppress the occurrence of an impact caused by the clutch engagement.

In order to attain the objective described above, the present disclosure, according to one aspect, may include: a standby control step in which a controller controls clutch torque to instantaneously rise to standby torque corresponding to a touch point-standby position prior to a clutch touch point when a gear lever is shifted from a neutral position to a driving position; and a torque control step in which the controller, after the standby control step, controls the clutch torque to rise to follow the clutch target torque while passing through a clutch touch point, wherein the rising slope of the clutch torque varies depending on whether or not a brake is in operation.

The torque control step may include, when it is determined that the brake is not in operation, performing control such that a rising slope of the clutch torque up to the clutch touch point is gentler than when it is determined that the brake is in operation.

The torque control step may include: performing control such that the clutch torque rises at the same rising slope before and after passing through the touch point when it is determined that the brake is in operation; and performing control such that the clutch torque rises at different rising slopes before and after passing through the touch point when it is determined that the brake is not in operation.

The torque control step may include: a brake determination step of determining whether or not the brake is in operation; and a first torque control step of controlling the clutch torque to rise to follow clutch target torque determined by brake operating pressure when it is determined that the brake is in operation.

The torque control step may include: a brake determination step of determining whether or not the brake is in operation; a 2-1st torque control step of determining threshold torque passing through the touch point as first clutch target torque and of controlling the clutch torque to rise to follow the first clutch target torque when it is determined that the brake is not in operation; and a 2-2nd torque control step of determining creep target torque as second clutch target torque and of controlling the clutch torque to rise to follow the second clutch target torque after the 2-1st torque control step.

The rising slope of the clutch torque in the 2-1st torque control step may be controlled to be gentler than the rising slope of the clutch torque in the 2-2nd torque control step.

A method for controlling a clutch for a vehicle, according to another aspect, may include: a standby control step in which a controller controls clutch torque to instantaneously rise to standby torque corresponding to a touch point-standby position prior to a clutch touch point when a gear lever is shifted from a neutral position to a driving position; a brake determination step in which the controller determines whether or not a brake is in operation; and a first torque control step in which the controller controls the clutch torque to rise to follow clutch target torque determined by brake operating pressure when it is determined that the brake is in operation.

A method for controlling a clutch for a vehicle, according to another aspect, may include: a standby control step in which a controller controls clutch torque to instantaneously rise to standby torque corresponding to a touch point-standby position prior to a clutch touch point when a gear lever is shifted from a neutral position to a driving position;

a brake determination step in which the controller determines whether or not a brake is in operation; a 2-1st torque control step of determining threshold torque passing through the touch point as first clutch target torque and of controlling the clutch torque to rise to follow the first clutch target torque when it is determined that the brake is not in operation; and a 2-2nd torque control step of determining creep target torque as second clutch target torque and of controlling the clutch torque to rise to follow the second clutch target torque after the 2-1st torque control step.

The present disclosure having the configurations described above has an effect of effectively reducing the engagement impact that occurs upon the engagement of a clutch and of improving clutch engagement control and driving responsiveness by controlling the rising slope of clutch torque to vary depending on whether or not a brake is in operation.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
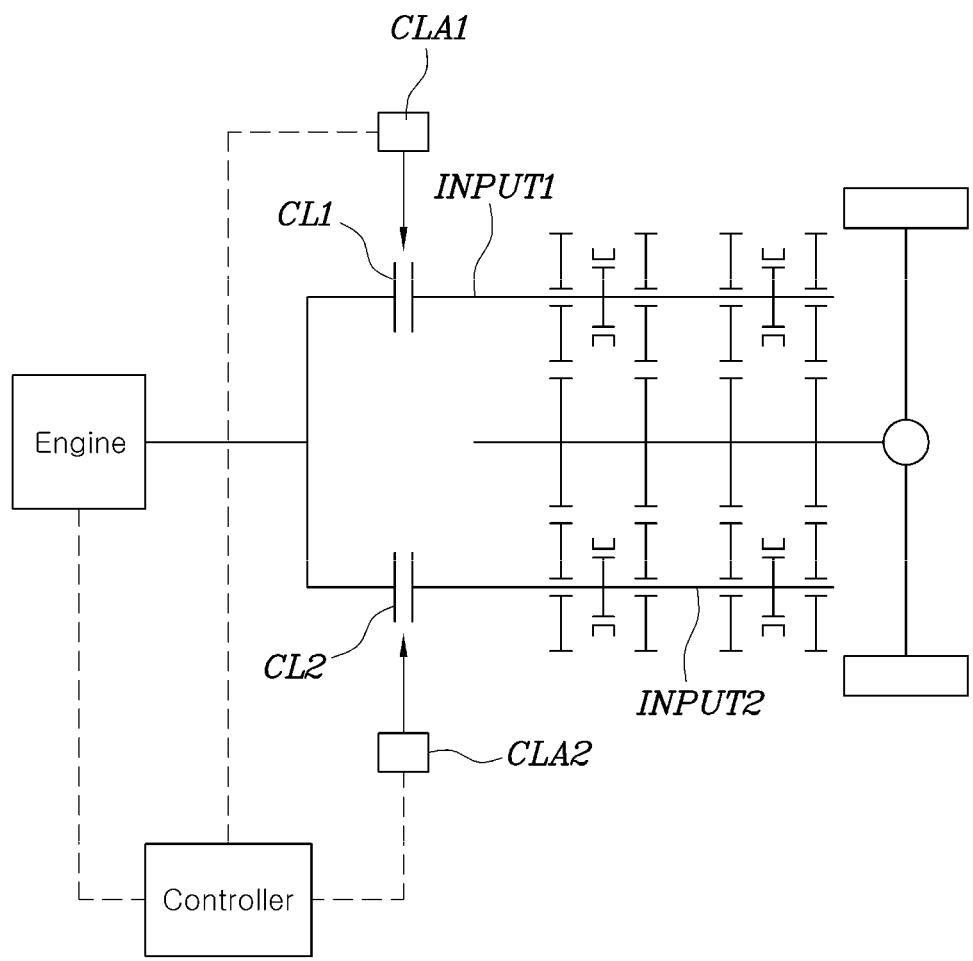
FIG. 1 is a view illustrating an example of the configuration of a power train on which a DCT is mounted, which is applicable to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A preferred embodiment of the present disclosure will now be described in detail with reference to the accompanying drawings.

FIG. 1 illustrates an example of the configuration of a power train of a DCT vehicle applicable to the present disclosure. Briefly describing respective elements shown in the drawing, a clutch on a coupling side and a clutch on a releasing side are among two clutches provided in the DCT and are denoted by reference numerals CL1 and CL2, respectively, and a clutch actuator on the coupling side and a clutch actuator on the releasing side for operating the same are denoted by reference numerals CLA1 and CLA2, respectively.

In addition, an input shaft on the coupling side and an input shaft on the releasing side are denoted by reference numerals INPUT1 and INPUT2, respectively. However, this is merely for the convenience of understanding of the present disclosure, and the coupling side and the releasing side may be interchanged depending on the clutch that forms a current transmission and a clutch to form a target transmission.

Meanwhile, a method of controlling a clutch for a vehicle of the present disclosure may be configured to include a standby control step and a torque control step.

The present disclosure will be described in detail with reference to FIGS. 1 and 2. First, in the standby control step, a controller may control clutch torque to instantaneously rise to standby torque corresponding to a touch point-standby position prior to a clutch touch point when a gear lever is shifted from a neutral position to a driving position.

For example, the neutral position may be an N-position of a shift gate and the driving position may be a D-position (or an R-position) thereof.

In addition, the touch point may be obtained by means of a T-S curve indicating the relationship between a stroke of a clutch actuator and clutch transmission torque, and the touch point-standby position may be set to be any position immediately before reaching the touch point.

Figure 3:
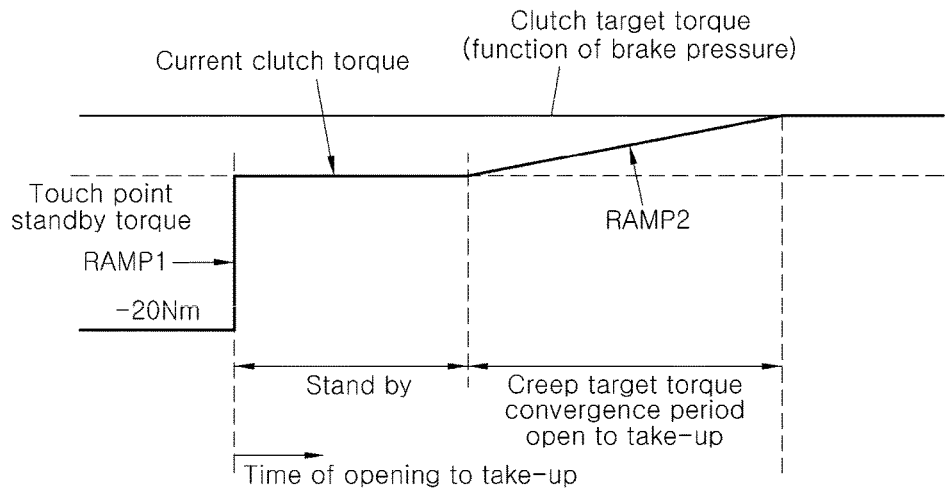
FIG. 3 is a view showing the behavior of clutch torque while a brake is in operation according to the present disclosure.
Figure 4:
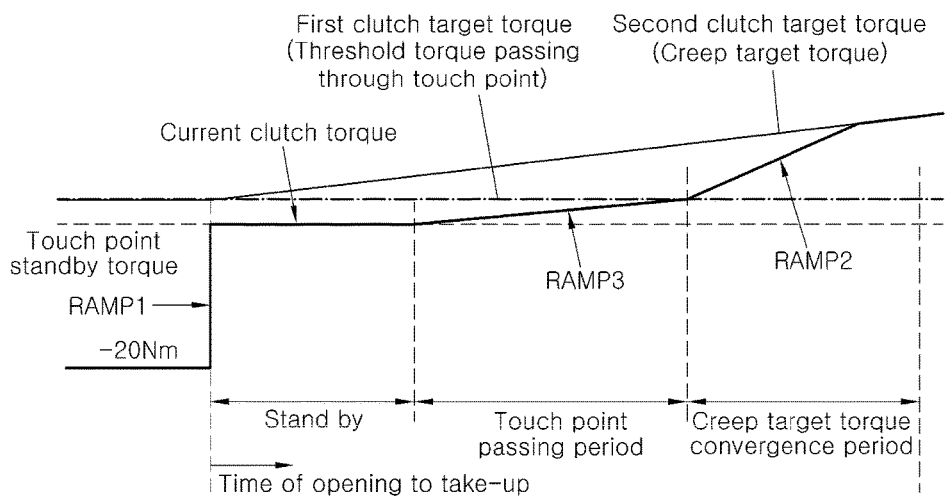
FIG. 4 is a view showing the behavior of clutch torque while a brake is not in operation according to the present disclosure.

That is, the stroke of the clutch actuator may range from a lowest stroke position of the clutch actuator (fully released state of the clutch) to a predetermined touch point-standby position, and clutch torque may instantaneously rise in the form of a step up to standby torque corresponding to the touch point-standby position as RAMP1 in FIGS. 3 and 4.

Of course, since the clutch is physically disengaged in a so-called invalid stroke period of the clutch actuator, which ranges from the lowest stroke position of the clutch actuator to a position immediately before reaching the touch point, even if there is a change in the stroke of the clutch actuator, the actual torque transmitted through the clutch is 0 Nm.

However, the control of the clutch may be performed based on a T-S curve (clutch transmission torque map) that forms the relationship between a stroke of the clutch actuator and clutch transmission torque. Here, the clutch transmission torque in the invalid stroke period before the touch point is operated as a negative (−) torque, so that the clutch torque can vary with a change in the stroke of the clutch actuator even in the invalid stroke period.

Thus, in the present application, it should be noted that the clutch torque is illustrated and explained to be increased and decreased even in the invalid stroke period, in which the clutch torque is not transmitted.

In addition, in the torque control step of the present disclosure, after the standby control step, the controller may perform control such that the clutch torque rises to follow the clutch target torque while passing through a clutch touch point, and may perform control such that a rising slope of the clutch torque varies depending on whether or not a brake is in operation.

For example, when it is determined that the brake is not in operation, a rising slope of the clutch torque up to the clutch touch point may be controlled to be gentler than when it is determined that the brake is in operation.

In other words, according to the above-described configuration, since a vehicle remains stopped while the brake is in operation, the vehicle does not move even if the clutch is engaged. Therefore, in this case, it is possible to improve responsiveness by rapidly engaging the clutch because the engagement impact of the clutch is not too strong even if clutch torque is rapidly applied.

On the other hand, when the brake is not in operation, the driving force of an engine is transmitted to the vehicle upon the engagement of the clutch. Therefore, if the clutch torque is rapidly applied such that the clutch is quickly engaged, the engagement impact of the clutch becomes big due to vehicle inertia. As a result, it is possible to reduce the engagement impact of the clutch by slowly applying clutch torque up to the touch point while the brake is not in operation, and it is possible to improve driving responsiveness by rapidly applying clutch torque after the touch point.

Meanwhile, in the torque control step of the present disclosure, when it is determined that the brake is in operation, the clutch torque may be controlled to linearly rise at the same rising slope before and after passing through the touch point.

For example, when it is determined that the brake is in operation, the clutch torque may be controlled to rise at the same slope as RAMP2 shown in FIG. 3 so that the clutch torque follows one clutch target torque regardless of the touch point.

Figure 2:
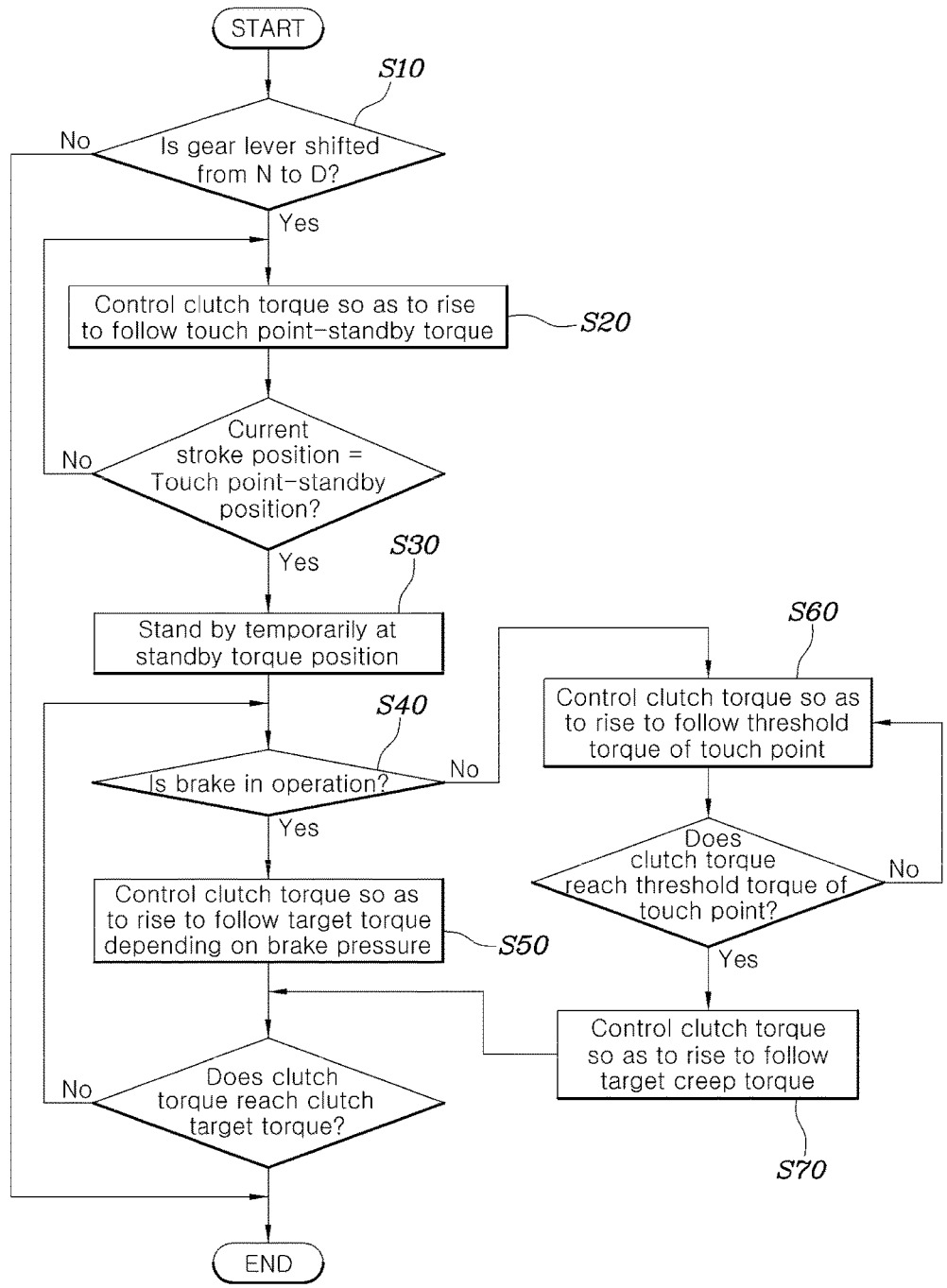
FIG. 2 is a flowchart illustrating overall control of a clutch according to the present disclosure.

More specifically, referring to FIGS. 2 and 3, the torque control step may be configured to include a brake determination step and a first torque control step.

First, in the brake determination step, whether or not a driver is operating a brake may be determined.

In addition, in the first torque control step, when it is determined that the brake is in operation as a result of the determination above, the clutch torque may be controlled to rise to follow clutch target torque, which is determined by brake operating pressure.

That is, since the brake operating pressure may be determined depending on the extent to which a brake pedal is depressed and the clutch target torque may be determined by the brake operating pressure, the clutch torque is controlled to rise to follow the clutch target torque.

Therefore, it is possible to suppress engagement impact due to the clutch engagement by operating the brake while improving clutch control responsiveness by quickly applying the clutch torque.

Meanwhile, in the torque control step of the present disclosure, it is possible to perform control such that the clutch torque rises at different rising slopes from each other before and after passing through the touch point when it is determined that the brake is not in operation.

For example, when it is determined that the brake is not in operation, the clutch torque may be controlled to rise at different slopes before and after the touch point as RAMP2 and RAMP3, respectively, shown in FIG. 4 to follow different clutch target torque values.

More specifically, referring to FIGS. 2 and 4, the torque control step may be configured to include a brake determination step, a 2-1st torque control step, and a 2-2nd torque control step.

First, in the brake determination step, whether or not a driver operates a brake may be determined.

In addition, in the 2-1st torque control step, when it is determined that the brake is not in operation as a result of the determination above, threshold torque passing through the touch point may be determined as first clutch target torque, and the clutch torque may be controlled to rise to follow the first clutch target torque.

Further, in the 2-2nd torque control step after the 2-1st torque control step, creep target torque for following a target creep vehicle speed may be determined as second clutch target torque, and the clutch torque may be controlled to rise to follow the second clutch target torque. Here, the creep target torque may be clutch torque calculated by feedback control in order to follow a target creep vehicle speed (for example, about 5 KPH).

At this time, the rising slope of clutch torque in the 2-1st torque control step may be controlled to be gentler (i.e. lower in slope) than the rising slope of clutch torque in the 2-2nd torque control step.

That is, when the brake is not in operation, the torque (threshold torque) corresponding to a value upon reaching the touch point may be determined as clutch target torque until the clutch torque reaches the touch point, and the clutch torque may be controlled to follow the threshold torque (first clutch target torque) such that the clutch torque rises at the same slope as RAMP3, which is relatively gentle, thereby reducing engagement impact due to the clutch engagement.

In addition, after reaching the touch point, creep target torque may be determined as the clutch target torque, and the clutch torque is controlled to follow the creep target torque such that the clutch torque rises at the same slope as RAMP2, which is relatively steeper (higher slope) than RAMP3, thereby improving driving responsiveness.

Meanwhile, FIG. 3 shows a clutch torque control profile when a gear lever is shifted from an N-position to a D-position while the vehicle is stopped. Hereinafter, clutch control while the brake is in operation will be described with reference to FIG. 2.

It is determined whether or not a gear lever is shifted from an N-position to a D-position (S10).

When it is determined that the gear lever has been shifted to the D-position as a result of the determination, clutch torque is controlled to rise up to standby torque corresponding to a predetermined touch point-standby position such that a stroke position of a clutch actuator reaches the touch point-standby position (S20).

Subsequently, while temporarily standing by at the touch point-standby position (S30), it is determined whether or not the brake is in operation (S40).

When it is determined that the brake is in operation as a result of the determination, clutch target torque is determined depending on brake operating pressure, and the clutch torque is controlled to rise to follow the clutch target torque (S50).

Meanwhile, FIG. 4 shows a clutch torque control profile when a gear lever is shifted from an N-position to a D-position while a vehicle is moving at a constant speed, or when creep reacceleration is conducted by shifting the gear level from the N-position to the D-position while the vehicle speed is decreasing while moving due to inertia. Hereinafter, clutch control while the brake is not in operation will be described with reference to FIG. 2.

It is determined whether or not a gear lever is shifted from an N-position to a D-position (S10).

When it is determined that the gear lever has been shifted to the D-position as a result of the determination, clutch torque is controlled to rise up to standby torque corresponding to a predetermined touch point-standby position such that a stroke position of a clutch actuator reaches the touch point-standby position (S20).

Subsequently, standing by at the touch point-standby position (S30), it is determined whether or not the brake is in operation (S40).

When it is determined that the brake is not in operation as a result of the determination, first clutch target torque is determined based on threshold torque of a touch point, and the clutch torque is controlled to rise to follow the first clutch target torque (S60).

Next, when the clutch torque reaches the first clutch target torque, second clutch target torque is determined based on creep target torque, and the clutch torque is controlled to rise to follow the second clutch target torque (S70).

As described above, the present disclosure can effectively reduce the engagement impact that occurs upon the engagement of a clutch, and can improve clutch engagement control and driving responsiveness by performing control such that a rising slope of clutch torque varies depending on the operation of a brake.

While the present disclosure has been described in detail with reference to a specific embodiment above, it will be obvious to those skilled in the art that various modifications and changes thereof can be made without departing from the scope of the present disclosure, which belongs to the claims appended below.

The description of the disclosure is merely exemplary in nature and, thus, variations that do not depart from the substance of the disclosure are intended to be within the scope of the present disclosure. Such variations are not to be regarded as a departure from the spirit and scope of the present disclosure.

The invention claimed is:

1. A method of controlling a clutch for a vehicle, the method comprising:
    a standby control step in which a controller controls a clutch torque to instantaneously rise to a standby torque corresponding to a touch point-standby position prior to a clutch touch point when a gear lever is shifted from a neutral position to a driving position; and
    a torque control step in which the controller, after the standby control step, controls the clutch torque to rise to follow a clutch target torque while passing through the clutch touch point, wherein a rising slope of the clutch torque varies depending on whether or not a brake is in operation.

2. The method of claim 1, wherein the torque control step comprises, when it is determined that the brake is not in operation, performing control such that the rising slope of the clutch torque up to the clutch touch point is gentler than when it is determined that the brake is in operation.

3. The method of claim 1, wherein the torque control step comprises:
    performing control such that the clutch torque rises at the same rising slope before and after passing through the touch point when it is determined that the brake is in operation; and
    performing control such that the clutch torque rises at different rising slopes before and after passing through the touch point when it is determined that the brake is not in operation.

4. The method of claim 1, wherein the torque control step comprises:
    a brake determination step of determining whether or not the brake is in operation; and
    a first torque control step of controlling the clutch torque to rise to follow the clutch target torque determined by brake operating pressure when it is determined that the brake is in operation.

5. The method of claim 1, wherein the torque control step comprises:
    a brake determination step of determining whether or not the brake is in operation;
    a 2-1st torque control step of determining a threshold torque passing through the touch point as a first clutch target torque and of controlling the clutch torque to rise to follow the first clutch target torque when it is determined that the brake is not in operation; and
    a 2-2nd torque control step of determining a creep target torque as a second clutch target torque and of controlling the clutch torque to rise to follow the second clutch target torque after the 2-1st torque control step.

6. The method of claim 5, wherein the rising slope of the clutch torque in the 2-1st torque control step is controlled to be gentler than the rising slope of the clutch torque in the 2-2nd torque control step.

7. A method for controlling a clutch for a vehicle, the method comprising:
    a standby control step in which a controller controls a clutch torque to instantaneously rise to a standby torque corresponding to a touch point-standby position prior to a clutch touch point when a gear lever is shifted from a neutral position to a driving position;
    a brake determination step in which the controller determines whether or not a brake is in operation; and
    a first torque control step in which the controller controls the clutch torque to rise to follow a clutch target torque determined by brake operating pressure when it is determined that the brake is in operation.

8. A method for controlling a clutch for a vehicle, the method comprising:
    a standby control step in which a controller controls a clutch torque to instantaneously rise to a standby torque corresponding to a touch point-standby position prior to a clutch touch point when a gear lever is shifted from a neutral position to a driving position;
    a brake determination step in which the controller determines whether or not a brake is in operation;
    a 2-1st torque control step of determining a threshold torque passing through the touch point as a first clutch target torque and of controlling the clutch torque to rise to follow the first clutch target torque when it is determined that the brake is not in operation; and
    a 2-2nd torque control step of determining a creep target torque as a second clutch target torque and of controlling the clutch torque to rise to follow the second clutch target torque after the 2-1st torque control step.

* * * * *